Nov. 19, 1957  J. D. MARCELLUS  2,813,723
FLOATING REAMER HOLDER
Filed Oct. 27, 1954

Inventor
James D. Marcellus
By McCanna and Morsbach
Attys.

United States Patent Office 2,813,723
Patented Nov. 19, 1957

2,813,723
FLOATING REAMER HOLDER

James D. Marcellus, Belvidere, Ill., assignor to Marcellus Mfg. Co., Belvidere, Ill., a corporation of Illinois Application October 27, 1954, Serial No. 465,074

7 Claims. (Cl. 279—18)

This invention relates to tool holders and more particularly to a holder for supporting a tool such as a reamer for lateral shifting and tilting movement.

An important object of this invention is the provision of a tool holder having an improved construction for supporting a tool for free lateral shifting and tilting movement.

Another object of this invention is the provision of a tool holder for supporting a tool for free lateral shifting and tilting movement which is arranged to normally maintain the tool axis parallel to the axis of the driving member.

Yet another object of this invention is the provision of a tool holder including a tool head supported for limited lateral shifting and tilting movement relative to the body member and yieldably urged to a position in which the axis of the tool head is parallel to the axis of the body member, and in which the pressure applied to maintain the axis of the tool head parallel to the axis of the body member may be readily adjusted.

A further object of this invention is the provision of a free floating tool holder of simple and compact construction which is highly efficient for the intended purpose.

These, together with various ancillary objects and advantages of this invention will be more readily appreciated as the same becomes better understood by reference to the following detailed description when taken in connection with the accompanying drawings.

Figure 1:
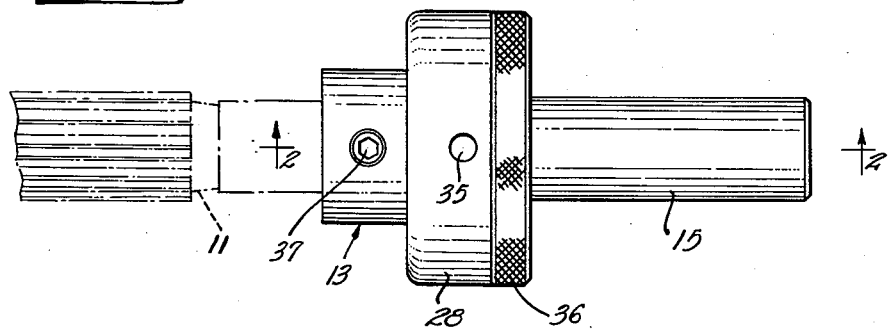
Figure 1 is a side elevational view of the tool holder showing a tool mounted therein.

Reference is now made more specifically to the accompanying drawings wherein there is illustrated the tool holder for supporting a tool 11 for free lateral shifting and tilting movement. In general, the tool holder comprises a body 12, a tool head 13 and a coupling member 14 which is arranged to drivingly interconnect the body member and the tool head and permit limited lateral shifting movement therebetween. An abutment designated 19a is formed on the body member to extend normal to the axis thereof and the tool head is yieldably urged against the abutment on the body member so as to thereby normally maintain the axis of the tool head parallel to the axis of the body member.

The body member includes a mounting shank 15 having an axially extending passage 16 therein and an enlarged end portion 17 formed on one end of the shank. The face 17a of the end portion 17 which registers with the tool head is formed with a peripheral axially extending rim 19, the end face 19a of which is disposed normal to the axis of the shank to provide an abutment for the tool head. Provision is made for drivingly interconnecting the body and the tool head in such a manner as to permit limited lateral shifting movement therebetween. For this purpose, a diametrically extending recess 21 is formed in the face 17a of the enlarged end portion 17 and, as illustrated in the drawings, the recess extends through the annular rim 19. It is to be understood, however, that the recess need not extend through the rim, it being sufficient to provide the recess in the end face 17a of the enlarged portion 17 within the inner periphery of the rim 19. The coupling member 14 may be of various different constructions and is here shown in the form of a toroid 22. The coupling member is loosely received within the periphery of the rim 19 for limited lateral shifting movement therein, and is provided with lugs 23 which are received in the diametrically extending recess 21 in the end face of the body member.

Figure 2:
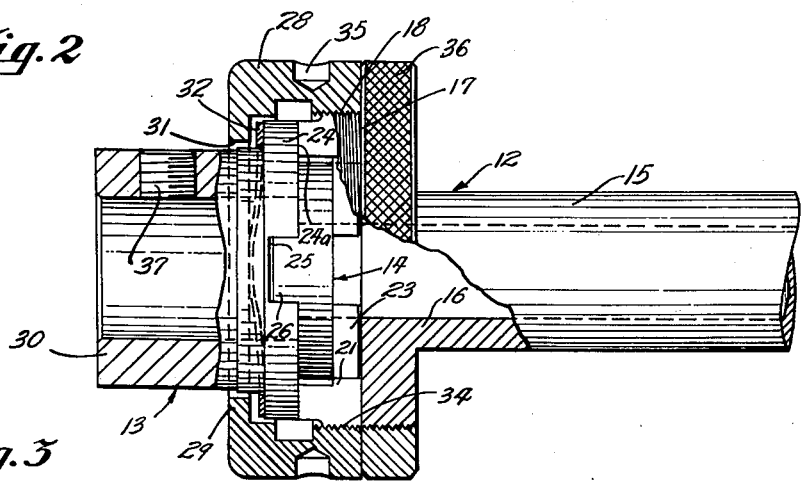
Fig. 2 is a fragmentary longitudinal sectional view through the tool holder.

The tool head 13 is formed with an outwardly extending peripheral flange 24 on one end thereof having an end face 24a disposed normal to the axis of the tool head and adapted to abut the end face 19a on the rim 19. The flange has a diametrically extending recess 25 formed in the face 24a thereof which registers with the body member for the reception of the lugs 26 on the side of the coupling member 22 opposed to the side from which the lugs 23 extend. As is conventional in this type of coupling member, the lugs 26 are angulated 90° with respect to the lugs 23 to permit movement of the coupling member relative to the body member and movement of the tool head relative to the coupling member in a direction transverse the axis of the body member and along angularly disposed paths. The tool head is maintained in assembled relation on the body member by means of an annular cap 28, which cap has an inwardly extending flange 29 on one end thereof. As best shown in Fig. 2, the flange 29 defines an axially disposed opening 31 adapted to loosely receive the tool receiving socket 30 of the tool head to permit limited lateral shifting and tilting movement of the latter relative to the cap.

Figure 3:
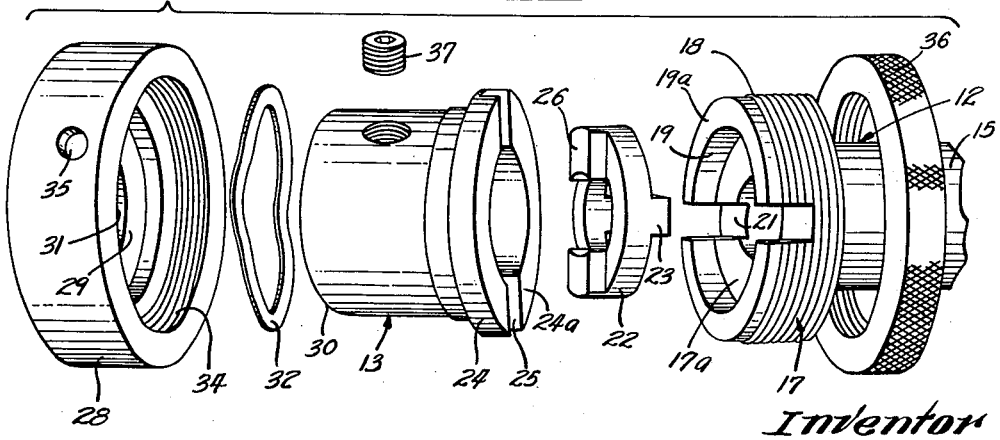
Fig. 3 is an exploded view of the tool holder.

Provision is made for yieldably urging the flanged end of the tool head against the abutment formed by the end face 19a of the rim 19 to thereby normally maintain the axis of the tool head parallel to the axis of the body member. For this purpose there is provided a spring member 32, here shown in the form of an axially undulated washer, which is interposed between the flange 29 on the cap 38 and the flange 24 on the tool head. The spring yieldably urges the end face 24a of the tool head against the end face 19a of the rim 19, and is arranged to permit sliding movement between the spring and the cap so that the tool head may readily shift laterally relative to the cap. The pressure which is applied by the spring to maintain the tool head against the abutment formed by the end face 19a of the rim 19 is preferably made adjustable. As best shown in Figs. 2 and 3, the enlarged end portion 17 is externally threaded at 18 and threadedly receives the internally threaded end portion 34 of the cap 28 whereby the latter may be adjusted on the body, as by a suitable spanner wrench which is received in the sockets 35 formed in the periphery of the cap, to thereby adjustably apply pressure to the spring 32. A spanner nut 36 is also threaded on the enlarged end portion 17 to lock the cap in its adjusted position.

From the foregoing it is thought that the operation of the tool holder will be readily understood. The tool such as the reamer 11, is inserted in the socket 30 of the tool head member 13 and locked therein as by the set screw 37. The spring 32, acting against the flange 24 on the tool head, presses the end face 24a thereof against the abutment formed by the end face 19a of the rim 19 and thereby normally maintains the axis of the reamer parallel to the axis of the body member 15. As the reamer enters the bore on the work piece (not shown), the tool head and tool may shift laterally of the axis of the body member to align itself with the bore in the work piece, the spring 32 permitting relative sliding movement between the tool head and the cap. Moreover, the tool head may also tilt relative to the drive member, against the bias of the spring 32, as required to obtain concentricity between the reamer and the bore being reamed. When the reamer is retracted from the bore, the spring 32 returns the tool head and reamer to a position in which the axes thereof extend parallel to the axis of the body member thereby preventing wobbling of the reamer as the latter is rotated and facilitating insertion of the reamer into the succeeding bore which is to be reamed.

I claim:

1. A floating tool holder comprising a tool head member having an outwardly extending peripheral flange at one end thereof, a body member having an axially extending peripheral rim at one end thereof forming an abutment disposed normal to the axis of the body member and engageable with the flanged end of the tool head, a cap on said body member loosely surrounding said tool head and having an inwardly extending flange thereon, means interposed between the flanges on the cap and tool head yieldably urging the flange on the tool head into engagement with said abutment on the body member, and means disposed within said rim and interposed between the body member and the tool head drivingly interconnecting the same and arranged to permit limited lateral shifting movement therebetween.

2. A floating tool holder comprising a body member and a tool head having diametrical recesses in the opposed faces thereof, a coupling member disposed between the body member and the tool head and having lugs extending into said recesses, an annular rim on said body member loosely surrounding said coupling member and having an end face normal to the axis of said body member providing an abutment for the tool head, and means yieldably urging the tool head against said abutment on the body member to normally maintain the axis of the tool head parallel to the axis of the body member.

3. A floating tool holder comprising a body member and a tool head having diametrical recesses in the opposed faces thereof, a radially extending peripheral flange on said tool head, a coupling member disposed between the body member and the tool head and having lugs extending into said recesses, an annular rim on said body member loosely surrounding said coupling member and having an end face normal to the axis of said body member providing an abutment for engagement with the flange on the tool head, a cap attached to said body member and extending around the flange on the tool head, said cap having an inwardly extending flange thereon loosely surrounding said tool head, and spring means disposed between said flange on said cap and said flange on said tool head yieldably urging said flange on the tool head against the rim on the body member to normally maintain the axis of the tool head parallel to the axis of the body member, said spring means being loosely received between said cap and said tool head to permit limited radial shifting movement therebetween.

4. The combination of claim 3 wherein said spring means comprises an axially undulated metal washer providing axially spaced inner and outer contact points at alternate locations around the spring respectively engageable with the flange on the tool head and the flange on the cap.

5. A floating tool holder comprising a drive member including a shank having an enlarged externally threaded portion at one end thereof, a driven member including a tool receiving head having an outwardly extending peripheral flange at one end thereof, said enlarged portion having an axially extending peripheral rim formed thereon with an end face disposed normal to the axis of the shank, an annular cap threaded on said enlarged portion and loosely surrounding said flange on the driven member, an inwardly directed flange on said cap loosely surrounding the tool receiving head on said driven member, means interposed between the flange on said cap and the flange on the driven member yieldably urging the latter against the end face on said rim to normally maintain the axis of the driven member parallel to the axis of the drive member, said drive and driven members having diametrical recesses in the opposing faces thereof, and a coupling member loosely disposed within said rim between the opposing faces of the drive and driven members and having lugs received in the recesses therein to drivingly interconnect the drive and driven members.

6. A floating tool holder comprising a tool receiving head having an outwardly extending peripheral flange at one end thereof, a body member including an enlarged end portion and a shank extending axially from one side thereof, a coupling member interposed between the body member and the tool head for drivingly interconnecting the same and arranged to permit limited lateral shifting movement therebetween, means defining an abutment disposed normal to the axis of the body member and engageable with the flanged end of the tool head, a cap loosely surrounding said tool head and having an inwardly extending flange thereon, and an annular metal spring member loosely received within said cap and having smooth axial undulations defining axially spaced inner and outer contact points at alternate locations around the spring member and respectively engageable with the flange on said tool head and the flange on said cap to yieldably urge said tool head against said abutment and thereby normally maintain the axis of said tool head parallel to the axis of said body member while permitting lateral shifting movement therebetween.

7. A floating tool holder comprising a drive member including a shank having an enlarged externally threaded portion at one end thereof, a driven member including a tool receiving head having an outwardly extending peripheral flange at one end thereof, said enlarged end having an axially extending peripheral rim formed thereon with an end face disposed normal to the axis of the shank, an annular cap threaded on said externally threaded portion and loosely surrounding said flange on the driven member, an inwardly directed flange on said cap loosely surrounding the tool receiving head on the driven member, an annular spring loosely received between the tool receiving head and the cap to permit limited radial shifting movement therebetween and having smooth axial undulations defining axially spaced inner and outer contact points at annularly spaced location around the spring member respectively engaging the flange on the driven member and the flange on the cap to yieldably urge the driven member against the end face of the rim on the drive member and thereby normally maintain the axis of the driven member parallel to the axis of the drive member while permitting limited radial shifting therebetween, and a coupling member loosely disposed within said rim between the opposing faces of the drive and driven members and drivingly interconnecting said drive and driven members.

References Cited in the file of this patent

UNITED STATES PATENTS

| | | |
|---|---|---|
| 1,369,491 | Straehle | Feb. 22, 1921 |
| 2,399,808 | Jones | May 7, 1946 |
| 2,525,646 | Burg | Oct. 10, 1950 |
| 2,547,518 | Benjamin et al. | Apr. 3, 1951 |
| 2,626,812 | Jones | Jan. 27, 1953 |